United States Patent
Smith et al.

(10) Patent No.: US 9,466,196 B2
(45) Date of Patent: Oct. 11, 2016

(54) ANOMALOUS PHENOMENA DETECTOR

(71) Applicant: Cubic Corporation, San Diego, CA (US)

(72) Inventors: Gavin R. Smith, Crawley (GB); Steffen Reymann, Reigate (GB)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 14/678,524

(22) Filed: Apr. 3, 2015

(65) Prior Publication Data

US 2015/0287311 A1    Oct. 8, 2015

Related U.S. Application Data (60) Provisional application No. 61/976,955, filed on Apr. 8, 2014.

(51) Int. Cl.
| | |
|---|---|
| *G08B 19/00* | (2006.01) |
| *G06Q 10/00* | (2012.01) |
| *G06Q 50/30* | (2012.01) |

(52) U.S. Cl.
CPC .............. *G08B 19/00* (2013.01); *G06Q 10/00* (2013.01); *G06Q 50/30* (2013.01)

(58) Field of Classification Search
CPC ....... G06Q 10/00; G06Q 50/30; G08B 19/00
See application file for complete search history.

(56) References Cited

U.S. PATENT DOCUMENTS

| | | | |
|---|---|---|---|
| 9,019,092 B1* | 4/2015 | Brandmaier | B60R 25/102 340/426.1 |
| 2003/0171870 A1* | 9/2003 | Gueziec | G01C 21/26 701/423 |
| 2006/0235833 A1* | 10/2006 | Smith | H04W 4/22 |
| 2009/0327011 A1* | 12/2009 | Petroff | G06Q 10/02 705/5 |
| 2010/0281405 A1* | 11/2010 | Whattam | G06N 5/025 715/764 |
| 2011/0184901 A1* | 7/2011 | Lommock | G06F 21/55 706/47 |
| 2012/0130567 A1* | 5/2012 | Noffsinger | B61L 27/0077 701/19 |
| 2013/0297387 A1* | 11/2013 | Michael | G08G 1/0112 705/13 |
| 2015/0039397 A1* | 2/2015 | Fuchs | G06Q 30/0283 705/7.35 |
| 2015/0310749 A1* | 10/2015 | Sergott | G09B 19/00 434/366 |
| 2016/0036962 A1* | 2/2016 | Rand | H04R 1/1041 455/418 |

* cited by examiner

*Primary Examiner* — Quang D Pham
(74) *Attorney, Agent, or Firm* — Kilpatrick Townsend & Stockton LLP (57) ABSTRACT

Techniques are disclosed that utilize various devices, sensors, and/or systems as data points in a transportation system to establish normal operation of the transportation system and determine when one or more of the devices, sensors, and/or systems provides anomalous data indicative of a problem in the transportation system. Identifying a problem and/or implementing a solution can then be partially or fully automated, to help ensure a quick response and minimal disruption in service.

18 Claims, 6 Drawing Sheets

|  | Problem A | Problem B | Problem C | ... |
|---|---|---|---|---|
| Location 1 | Response Plan 1<br>Response Plan 2<br>Response Plan 3 | Response Plan 4<br>Response Plan 3 | Response Plan 4 | ... |
| Location 2 | Response Plan 2<br>Response Plan 3<br>Response Plan 1 | Response Plan 4<br>Response Plan 1<br>Response Plan 3 | Response Plan 4 | ... |
| Location 3 | Response Plan 2<br>Response Plan 3<br>Response Plan 1 | Response Plan 1 | Response Plan 4<br>Response Plan 1 | ... |
| ... | ... | ... | ... | |

ANOMALOUS PHENOMENA DETECTOR

CROSS-REFERENCE TO RELATED APPLICATION

The present application claims benefit under 35 USC 119(e) of 61/976,955, filed Apr. 8, 2014, entitled "ANOMALOUS PHENOMENA DETECTOR," the entire contents of which are incorporated by reference herein for all purposes.

BACKGROUND

The operation of transportation systems can have a large impact on a city because it can impact the way thousands or even millions of people travel each day. The speed of response to disruptions in the public transportation system can also have a profound effect on the efficiency the city. Pre-planning responses to particular events and being able to quickly action those plans can make a measurable difference to passenger satisfaction and economic output.

Problematically, however, a transportation system may take a relatively long time to determine when such disruptions occur. In many cases, a transportation system may take hours or even days to identify a disruption in service and/or location the problem causing the disruption. With the delay in identifying such disruptions also comes a delay in implementing solutions to the disruptions. Moreover, solutions are typically implemented on an ad-hoc basis. Pre-defined response plans may exist, but it is typically up to station staff to implement it case by case.

BRIEF SUMMARY

Techniques are disclosed that utilize various devices, sensors, and/or systems as data points in a transportation system to establish normal operation of the transportation system and determine when one or more of the devices, sensors, and/or systems provides anomalous data indicative of a problem in the transportation system. Identifying a problem and/or implementing a solution can then be partially or fully automated, to help ensure a quick response and minimal disruption in service.

An example method of detecting anomalous phenomena in a transit system, according to the disclosure, includes obtaining, over a period of time, data from a plurality of data sources of the transit system, and for each data source of the plurality of data sources, defining a range of data values indicative of normal operation of the transit system, based on data values obtained for the data source over the period of time. The method further comprises, subsequent to defining the range of data values for each data source of the plurality of data sources, obtaining additional data from a particular data source of the plurality of data sources, and comparing, using a processing unit, a value of the additional data from the particular data source to the corresponding defined range of data values for the particular data source. The method also comprises determining, based on the comparison, that an anomalous event has occurred in the transit system, in response to determining the occurrence of the anomalous event in the transit system, determining, from a plurality of predetermined response plans, a response plan to implement, and sending at least one message in accordance with the determined response plan to implement.

An example computer, according to the description, includes a communication interface configured to obtain, over a period of time, data from a plurality of data sources of a transit system, a memory, and a processing unit communicatively coupled with the communication interface and the memory. The processing unit is configured to for each data source of the plurality of data sources, define a range of data values indicative of normal operation of the transit system, based on data values obtained for the data source over the period of time via the communication interface, and subsequent to defining the range of data values for each data source of the plurality of data sources, obtain additional data from a particular data source of the plurality of data sources via the communication interface. The processing unit is further configured to compare a value of the additional data from the particular data source to the corresponding defined range of data values for the particular data source, determine, based on the comparison, that an anomalous event has occurred in the transit system, and in response to determining the occurrence of the anomalous event in the transit system, determine, from a plurality of predetermined response plans, a response plan to implement. The processing unit is also configured to send, via the communication interface, at least one message in accordance with the determined response plan to implement.

An example non-transitory computer-readable medium, according to the description, has instructions stored thereon for detecting anomalous phenomena in a transit system. The instructions include computer code for obtaining, over a period of time, data from a plurality of data sources of the transit system, and for each data source of the plurality of data sources, defining a range of data values indicative of normal operation of the transit system, based on data values obtained for the data source over the period of time. The instructions further include computer code for subsequent to defining the range of data values for each data source of the plurality of data sources, obtaining additional data from a particular data source of the plurality of data sources, comparing a value of the additional data from the particular data source to the corresponding defined range of data values for the particular data source, and determining, based on the comparison, that an anomalous event has occurred in the transit system. The instructions also include computer code for, in response to determining the occurrence of the anomalous event in the transit system, determining, from a plurality of predetermined response plans, a response plan to implement, and sending at least one message in accordance with the determined response plan to implement.

Embodiments of the invention can include a variety of advantages over traditional techniques. For example, there may be little or no need for transport operators to have to react to common disruptions. Further, passengers can be informed of alternate transport provision. The city can keep moving without extended delay. Revenue reallocation associated with one or more solutions implemented is appropriate to transport provision given. These and other advantages will be apparent to one of ordinary skill in the art in view of the following disclosure.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Transit and other transportation systems are used daily by millions of people around the world. Such systems can include, for example subway, light rail, regional rail, bus, taxi, ferry, and/or other means of transportation. As such, disruptions in services can impact many people, potentially impacting the traffic, economy, and/or other aspects of the locations served. To help identify problems in a transit system and quickly implement a response plan with one or more solutions, embodiments of the present invention employ techniques for identifying problems based on data received from various devices, sensors, and/or systems in the transportation system. As such, embodiments may enable a transit system to detect problems in real time (or near real time) and implement corresponding solutions automatically and/or under human direction.

As shown herein, embodiments may employ an anomaly detector to perform one or more functions. These functions can include, for example, pre-define disruption response plans, monitor live transport information, detect anomalies in transport and passenger behavior, inform staff about disruptions, activate disruption response plans, organize solutions, inform passengers of the problem and solution, allocate funds to pay for the solution, report the outcomes of implementing plans, and/or update improvements to the response plans. As such, the anomaly detector can enable a transit system (and/or individual components thereof) to respond to disruptions with far greater efficiency than previous techniques.

Figure 1:
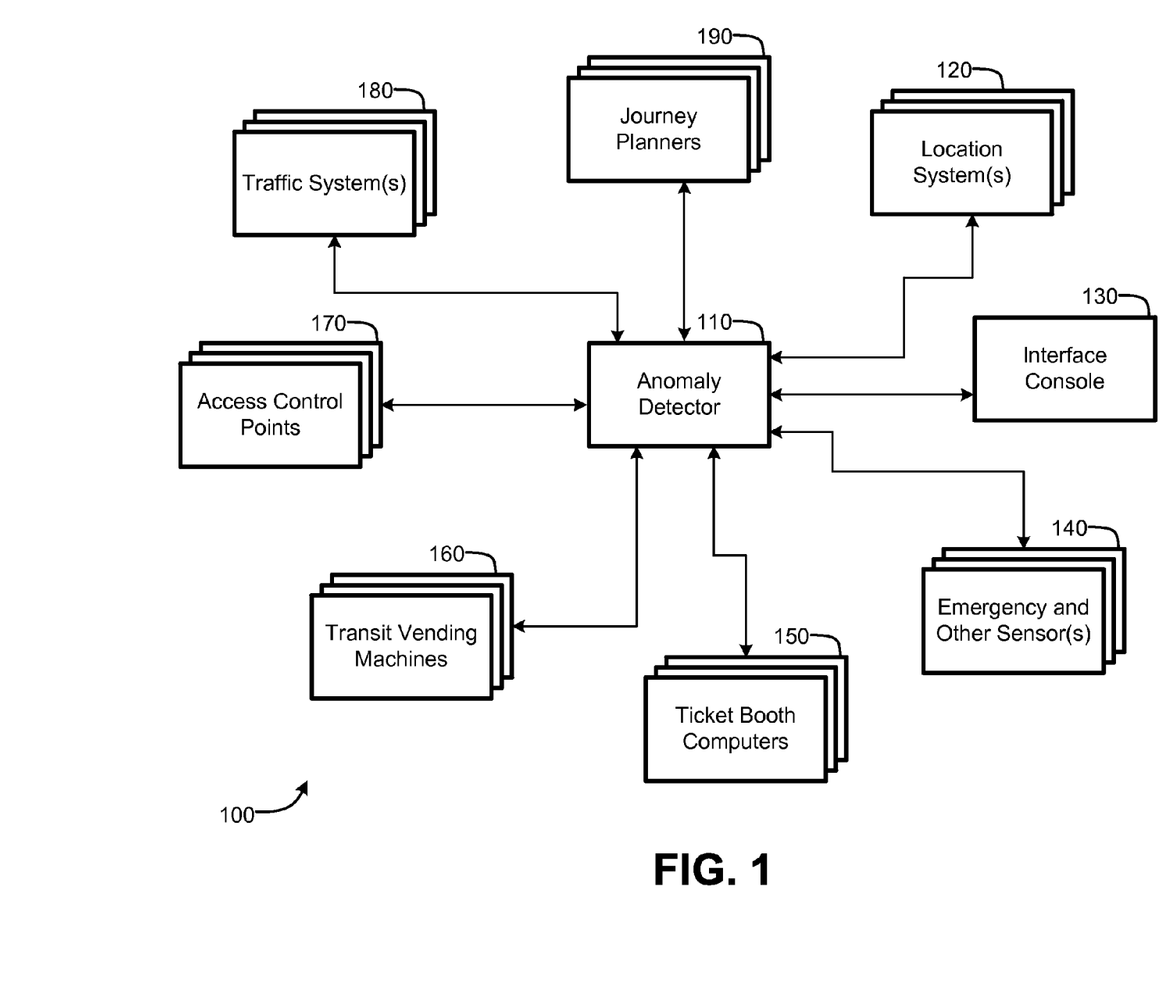
FIG. 1 is a block diagram illustrating various components of a transit system capable of implementing techniques disclosed herein, according to one embodiment.

FIG. 1 is a block diagram illustrating various components of a transit system 100, according to one embodiment. It will be understood, however, that the components shown are provided as an example, and all embodiments are not so limited. For example, other embodiments may vary from the embodiment illustrated in FIG. 1 by omitting, addition, substituting, combining, and/or dividing components. A person of ordinary skill in the art will recognize many variations.

As illustrated, the transit system 100 can comprise an anomaly detector 110 in communication with various other components, including location system(s) 120, an interface console 130, emergency and/or other sensor(s) 140, ticket booth computers 150, transit vending machines 160, access control points 170, traffic system(s) 180, and/or journey planners 190. Communication between the anomaly detector 110 and the other illustrated components may be accomplished via wired and/or wireless connections, one or more public and/or private data communication networks, including one or more local area networks, wide area networks (such as the Internet), and the like. Moreover, such communication may employ one or more of a variety of technologies and/or protocols (e.g., infrared, radio frequency (RF) long term evolution (LTE), IEEE 802.11, Bluetooth, and the like) to communicate. Additionally, embodiments may one or more intervening devices (e.g., station servers, relays, databases, etc.) from which the anomaly detector 110 may obtain information regarding the components, rather than via the components directly.

The anomaly detector 110 can receive data from the various components of the transit system 100 to determine whether devices, sensors, and/or systems are operating within normal operating conditions. As detailed below, the anomaly detector 110 may establish "normal" operating conditions based on historical data (e.g., data received by the various components of the transit system 100 over a window of time). When anomalous data is received after data for normal operating conditions has been established, it may be indicative of a problem. Accordingly, the anomaly detector 110 can identify anomalous data, and it may further implement a response plan with one or more solutions to correct the problem. In some cases, anomalous data may indicate that a data source (e.g., a transit vending machine) is not operating properly and needs to be serviced. In other cases, anomalous data may be indicative of a problem in the transit system 100 (e.g., an inoperable station).

For example, anomaly detector 110 can detect an anomaly by comparing real-time data received from the live system (e.g. received from components of the transit system 100 in real or near-real time) with historical data for similar periods. This can be as simple as comparing traffic at midday today with the traffic at midday yesterday, or traffic at midday on a Monday with the traffic at midday the previous Monday. It could also compare the first Monday in July with the first Monday last July, etc. Mathematical algorithms can be used to combine previous data sets, prioritizing their importance to build expectations.

The location system(s) 120 can include one or more systems that provide data regarding the location of transit vehicles in the transit system 100. Busses, trains, and/or other transit vehicles may be equipped with global positioning system (GPS) and/or other tracking technologies that enable the location system(s) 120 to determine where the transit vehicles are. Data provided by the location system(s) 120 may include the location(s) of one or more transit vehicles and/or data related to the location, such as data indicating one or more transit vehicles is behind schedule, ahead of schedule running an alternative route, and the like. The anomaly detector 110 may use anomalous data from the location system(s) 120 to determine, for example, that a transit vehicle has broken down and/or is running late.

Journey planners 190 can include kiosks and/or other devices that enable transit users to plan transportation within the transit system 100. The journey planners 190 may be coupled with and/or incorporated into transit vending machines 160 to enable users to purchase tickets and/or other fare media related transportation arranged via a journey planner. Data provided by the journey planners 190 and/or transit vending machines 160 can include, for example, departure, destination, and/or schedule information. The anomaly detector 110 may use anomalous data from the journey planners 190 and/or transit vending machines 160 to determine, for example, that a large amount of people will be travelling to a certain area at a certain time.

Traffic system(s) 180 may include one or more systems that provide data regarding, for example, land, water, and/or air traffic. The information may include information regarding non-transit vehicles, but may impact transit vehicles. For example, a traffic system may provide data regarding traffic levels of city streets. The traffic levels may be based on all traffic, including non-transit vehicles, such as private cars. Nonetheless, the traffic levels may impact busses and/or other transit vehicles. Thus, the anomaly detector 110 may use anomalous data from the traffic system(s) 180 to determine, for example, that anomalous traffic conditions may cause delays in certain transit routes.

Access control points 170 can generally include devices that restrict and/or monitor access to locations and/or vehicles of the transit system by transit users. Accordingly, the access control points can include turnstiles, faregates, platform validators (and/or other passenger ticket validators), para-transit vehicles, busses, conductor handheld units, and/or fare boxes. Data from the access control points can include a rate at which users enter and/or exit location(s) associated with the access control points, information regarding fare media used (e.g., the type of fare media, serial number, etc.), and the like. The anomaly detector 110 may use anomalous data from access control points 170 to determine, for example, that a subway station is being overused or underused.

Ticket booth computers 150 can include computers used by customer service agents and/or other transit employees. Such computers can, for example, be used for issuing tickets, opening transit accounts, and/or performing other functions, some of which may not be possible using a transit vending machine. Data provided by the ticket booth computers 150 can include, for example, departure, destination, and/or schedule information, as well as refund information and the like. The anomaly detector 110 may use anomalous data from the ticket booth computers 150 to determine, for example, that a large amount of people will be travelling to a certain area at a certain time.

Emergency and other sensor(s) 140 can include information from a variety of sources. Sensors can include, for example, smoke detectors, fire alarms, and/or other sensors capable of sensing emergencies, such as fire, flood, wind, and the like. Emergency and other sensor(s) 140 may include an interface to emergency services, such as police, fire, and/or ambulance services. Additionally or alternatively, live weather data and/or forecasts may be obtained via weather sensors and/or local weather information accessible via the Internet. Information regarding major public events (e.g. concerts, sports events, etc.) may also be obtained (e.g., via the Internet). Data provided by the emergency and other sensor(s) 140 can include, for example, raw sensor data and/or alerts or alarms generated by sensors and/or emergency service providers. The anomaly detector 110 may use anomalous data from the journey planners 190 and/or transit vending machines 160 to determine, for example, that an emergency is occurring at a particular transit station.

In some embodiments emergency and other sensor(s) 140 may include information from consumer devices, such as mobile phones. For example, some embodiments may enable transit passengers to enroll in a voluntary program in which their mobile devices execute an application that provides information, such as movement and location information derived from GPS and/or motion sensors, which is provided to the anomaly detector 110. From such data, the anomaly detector 110 may then determine the general movements of transit consumers through the transit system. Anomalies in these movements may be indicative of problems in the transit system.

Finally, the interface console 130 may enable an administrator to manage the operation of the anomaly detector 110. Embodiments of the interface console 130, as well as other consoles, computers, and electronic devices, may be implemented by one or more computers, such as the computer system 700 illustrated in FIG. 7. Additionally or alternatively, management of the anomaly detector 110 may be accessible via the Internet using any web-browsing device via, for example, a secure web portal.

The interface console 130 can, for example, enable an administrator to access a user interface of the anomaly detector 110. Using the user interface, the administrator can manage and/or alter functions of the anomaly detector 110, such as mapping a response plan (with one or more solutions) to implement when an anomaly and/or problem is detected. The user interface may also allow the administrator to set a threshold related to an anomaly before a response plan is implemented. For example, the administrator may indicate a certain number of anomalies must be detected within a specified time before the anomaly detector begins implementing a response plan. (In other words, the administrator may indicate what and/or how many anomalies may be detected before it is determined to be a "problem" for which a response plan is implemented.) The interface console 130 may additionally or alternatively provide an interface for an administrator to manually approve and/or select a response plan to implement once an anomaly has been detected, as detailed below.

It can be noted that the two-way arrows connecting the components of the transit system 100 in FIG. 1 indicate that the embodiment illustrated may allow for two-way communication between the anomaly detector 110 and the various other components. Accordingly, not only can the anomaly detector 110 use each of the various other components as data sources from which anomalies may be detected, but the anomaly detector 110 may also communicate with the various components. For example, when implementing a response plan to solve a problem manifested by anomalous data, the anomaly detector may communicate with one or more components to alter their functionality.

As a specific example, the anomaly detector 110 may determine, from anomalies in data from smoke detectors or other sensors, devices, and/or systems indicate that there is a fire in a transit station, the anomaly detector 110 may cause various devices to display a fire alarm messages, and cause access control points to open to allow transit passengers to exit the affected area freely.

In another example, the anomaly detector 110 may automatically contact bus and taxi companies external to the transit system 100 when there is a disruption on a railway line, letting them know where passengers will be forced to alight and how many passengers to expect. All travel taken on the "rescue" operators (e.g., operators that, as part of a response plan, provide alternative travel options for passengers disrupted in travel when utilizing a disrupting operator's transportation services), when paid for through an account, could be supplied free to the passenger, but paid for automatically by the disrupting operator (e.g., the broken railway would pay for the taxis and buses). Details of all the passengers affected could be passed to a transit authority for automatic compensation vouchers. As shown by this example, the anomaly detector 110 can help correctly and fairly allocate revenues by generating and storing, from data received and/or solutions implemented, facts about the modes of transport used, by whom, using which tickets. Ledger applications can then calculate, from the facts, the revenues deserved by the rescue operators and how much should be deducted from the disrupting operators.

Additionally or alternatively, the anomaly detector 110 may communicate with a device from which anomalous data was received to verify that the data received was correct. For example, the anomaly detector 110 may cause the device to perform one or more diagnostic tests to help determine if the data is correct and/or whether the anomalous data is due to a malfunctioning device, or whether it is indicative of a larger problem in the transit system.

Figure 2:
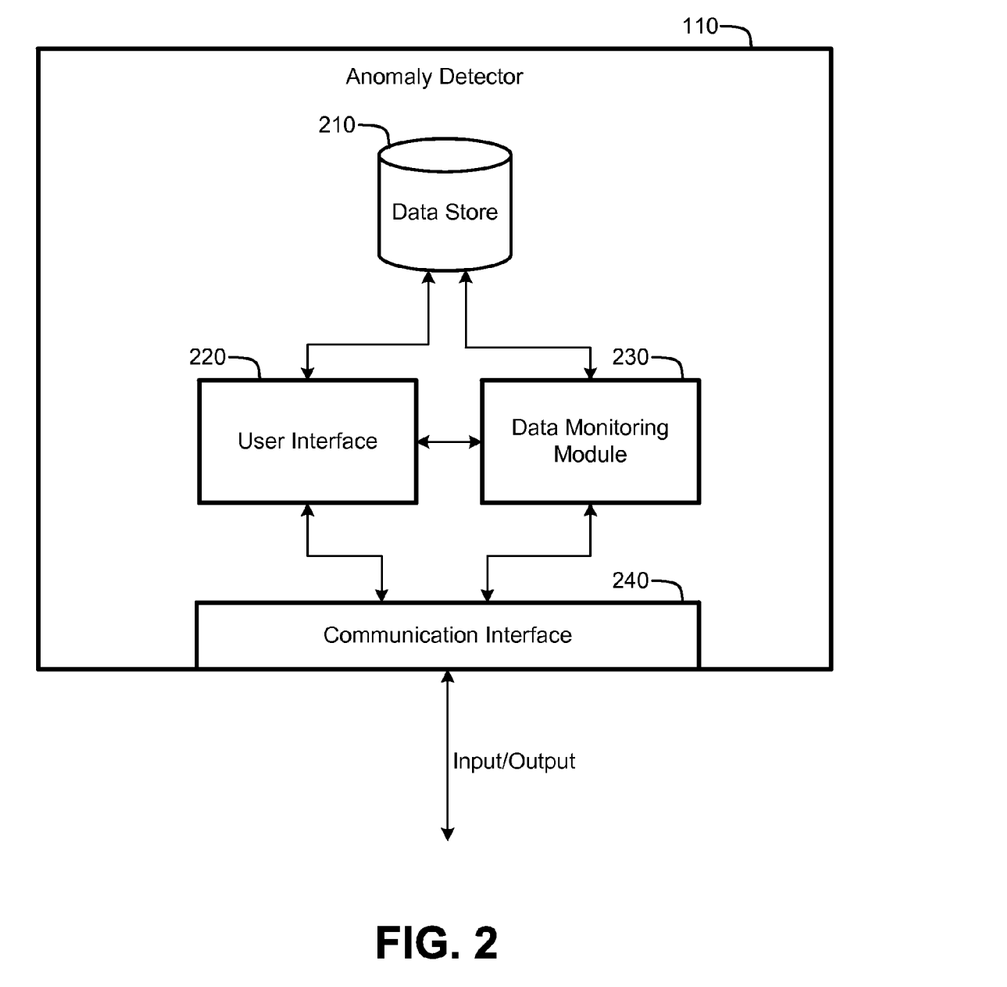
FIG. 2 is a simplified functional diagram of the components of the anomaly detector, according to one embodiment

FIG. 2 is a simplified functional diagram of the components of the anomaly detector 110, according to one embodiment. As with other figures herein, FIG. 2 provides an example of an embodiment; other embodiments may not be so limited. Other embodiments may, for example, add, omit, alter, combine, and/or remove components. A person of ordinary skill in the art will recognize many variations. All or a portion of the functional features illustrated in FIG. 2 may be performed by a computer system, such as the computer system 700 illustrated in FIG. 7.

A communication interface 240 can include hardware and/or software for communicating with the various components of the transit system 100, as illustrated in FIG. 1. Although illustrated in FIG. 2 as a single "Input/Output," and although it may communicate using a single communication link (e.g., to a network to which the other components of the transit system 100 are connected), some embodiments may enable the communication interface 240 to communicate using a plurality of communication methods, including, for example, one or more wireless and/or wired communication technologies.

A data monitoring module 230 comprises hardware and/or software configured to receive data from the various components of the transit system 100, via the communication interface 240, and monitor the data for anomalies. This may first entail establishing historical data indicative of a "normal" range of data for each of the components from which data is received. The data monitoring module 230 can utilize learning and/or other algorithms to accommodate changes in the data that may be included in the normal range of data. For example, the data monitoring module 230 may determine, from data received by an access control point 170 that a normal rate of passage of transit passengers during Monday mornings in May is different than a normal rate of passage of transit passengers at midnight on Saturday in December. In other words, the data monitoring module can determine whether fluctuations in hourly, daily, weekly, seasonal, etc. traffic are within normal bounds, based on past fluctuations in the same or similar circumstances.

As indicated above, a user interface 220 enables an administrator to manage various settings the anomaly detector 110. The user interface may be accessed by an interface console 130 and/or other device (e.g., via the Internet and/or other network(s) to which the anomaly detector 110 is connected). As provided in more detail below, a response plan implemented in response to problems that are manifest from anomalous data may be initiated by the anomaly detector 110. The user interface 220 can allow an administrator to create and/or select the response plan for a particular problem.

Additionally or alternatively, the user interface 200 may enable the administrator to identify and/or map problem(s) related to anomalous data. For example, an administrator may be able to specify that data indicative of low traffic through a single access control point 170 may be indicative of a problem with that particular access control point 170 or access to it by transit passengers. However, data indicative of low traffic through all access points in a transit station may be indicative of a problem with transit passengers accessing the station, or a problem with the station itself.

The anomaly detector 110 can additionally include a data store 210. The user interface 220 may use the data store 210 to store profiles and/or settings created by an administrator via the user interface. Problems associated with anomalous data and/or mappings of solutions to problems may also be stored in the data store 210. The data store 210 may also contain information regarding the personnel that should be informed in the event of a travel disruption. In some embodiments, this information may be associated with a particular solution to a particular problem. The time and severity of the disruption can dictate who is informed and how. The anomaly detector 110 can send messages to personnel (e.g., via email, text-message, telephone call, and the like) to inform them of the disruption. The data store may further keep logs of who was informed and when so that modifications may be made afterwards, if needed.

The data monitoring module 230 may also keep databases and/or other data structures in the data store 210 to store data received by the data monitoring module 230 from various components of the transit system 100. The data monitoring module 230 may further store analyses of the data, established normal data ranges, thresholds by which anomalous data is determined, and/or other information related to the received data in the data store 210.

The determination of what is normal and what is anomalous can be done by building detailed profiles of expected data for each data source (e.g., each component of the transit system 100 from which data is received) after receiving data from that data source over a period of time. Anomaly detection is then performed by later comparing live data with the expectation. Additionally or alternatively, cumulative data from a group of data sources (e.g., such as all access control points 170 in a transit station) and/or types of data sources (e.g., all transit vending machines 160) may be analyzed to establish normal and anomalous data ranges for that group and/or type. Accordingly, different data sources, different groups of data sources, and/or different types of data sources may have different thresholds with which data is analyzed to determine the occurrence of anomalous events.

Depending on the type of data source, a predetermined period of time may be used to gather data and establish "normal," or typical, conditions. A minimal period of time may be used to establish a sensible level of granularity of the data. In other words, the anomaly detector 110 may gather data for at least the predetermined period of time before determining whether anomalous data was received. Additionally or alternatively, predetermined values may be used thresholds for determining normal and/or anomalous data until data establishing "normal" conditions has been collected.

As indicated previously, learning algorithms may be used to establish normal trends over various periods of time. As data accumulates over hours, days, seasons, and years, the anomaly detector 110 can grow to accommodate daily, weekly, seasonal trends, etc. Thus, by determining past trends over a large period of time, the anomaly detector 110 can eventually determine "normal" data trends for less common events, such as annual holidays, seasonal changes in commuter behavior, and the like.

Figure 3:
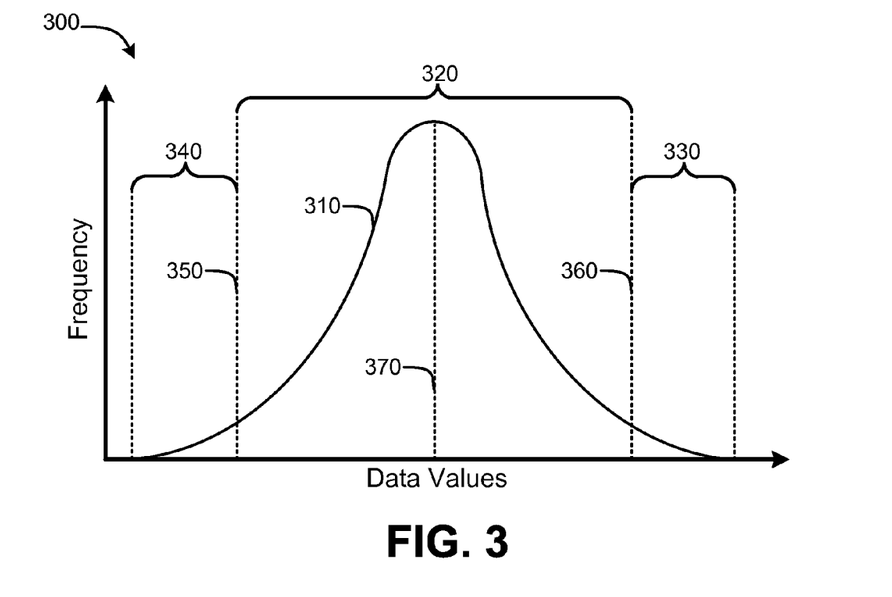
FIG. 3 is a generic graph provided to help illustrate how anomalous data may be detected, according to one embodiment.

FIG. 3 is a generic graph 300 provided to help illustrate how anomalous data may be detected, according to one embodiment. The graph 300 is a histogram showing the frequency of different data values for a set of data received by the anomaly detector 110 from one or more data sources during a certain period of time. Here, the plot 310 roughly illustrates a normal distribution of data values centered at a peak data value 370. For example, where the data source is an access control point, the data values could represent a rate of throughput for the access control point for weekday mornings from 6 AM to 9 AM.

With this data, the anomaly detector 110 may establish a range 320 in which most data values occur. This can establish a range in which data values are expected for under normal operating conditions. The range 320 can be based on, for example, the standard deviation of the data collected, a fixed percentage (e.g., a range in which 90% of data values occurs), and or other factors. Once the range 320 of normal values is established, an upper threshold 360 of data values and a lower threshold 350 of data values can be established. Incoming data values can then be compared with the upper and lower thresholds to determine whether the data values are anomalous. Data falling within these thresholds (that is, within the normal range 320) can be identified as normal. Data falling outside these thresholds (e.g., within upper range of data values 330 and lower range of data values 340) can be identified as anomalous.

It will be understood that embodiments may employ other techniques for establishing normal and/or anomalous data values. Techniques may vary, depending features of the data values received, such as type, range, distribution, etc. Some data sets may not have an upper threshold 360; others may not have a lower threshold 350. A person of ordinary skill in the art will recognize many variations.

Figure 4:
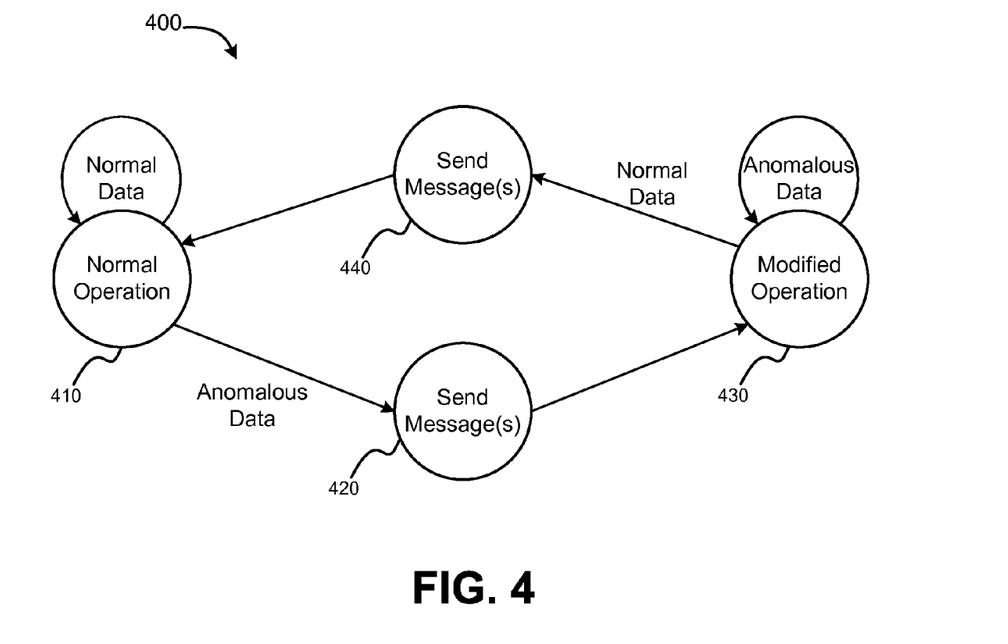
FIG. 4 is a state diagram illustrating functionality of the anomaly detector, according to a basic embodiment.

FIG. 4 is a state diagram 400 illustrating functionality of the anomaly detector 110, according to a basic embodiment. Other embodiments may vary by adding, omitting, substituting, consolidating, splitting apart, and/or rearranging the states illustrated. Furthermore, although the state diagram and embodiments described illustrate example operating states of an anomaly detector 110 detecting anomalous data indicative of a single problem and implementing a single solution, other embodiments may be configured to handle multiple problems (indicated by, for example, anomalous data from multiple data sources) simultaneously. In such cases the anomaly detector 110 may be configured to be in multiple states at once, and/or multiple anomaly detectors 110 or (in the case of a software implementation) multiple instances of an anomaly detector 110 may be utilized to detect and resolve multiple problems at once.

At state 410, the anomaly detector 110 receives normal data (that is, data that is indicative of normal operation of the transit system) and thereby determines that the transit system 100 is functioning under normal operation. Once it receives anomalous data, the anomaly detector 110 will move to state 420, where it sends one or more messages to one or more receiving entities.

The detection of anomalous data and subsequent change from state 410 to state 420 can be based on receiving a certain threshold of anomalous data. In some cases, perhaps a single anomalous datum may trigger the change from state from state 410 to state 420. In other cases, the data may first be verified (e.g., using diagnostics and/or other verification techniques performed by the source of the anomalous data) and/or a certain amount of anomalous data is first collected before changing to state 420. Such verification and/or anomalous data threshold amount(s) may be configurable by an administrator (e.g., via the user interface 220 of the anomaly detector 110).

The message(s) sent at state 420 can comprise communication to one or more entities. For example, for some embodiments and/or some instances, the anomaly detector 110 may send an alert and/or message to an administrator indicating that an anomaly has been detected and requesting input regarding whether to implement a response plan. In such situations, the system enables human oversight to verify anomalous data and/or implement one or more solutions as part of a response plan. In some circumstances (not shown in FIG. 4), the recipient (e.g., administrator) may choose to ignore such anomalies and continue normal operation, in which case the anomaly detector would return to the normal operation state 410.

Messages may additionally or alternatively include messages sent as part of a response plan to a problem manifest by anomalous data, which can include communication to transit personnel, passengers, devices, systems, etc. Such messages may contain, for example, instructions to transit personnel and passengers to follow to help implement a solution. For instance, messages to passengers may be delivered through public information screens, text messages, and/or alerts on an application executed by a mobile device. The passengers may be offered a course of action to get them to their destination. This can greatly reduce passenger frustration during disruptions as well as allow the transit authority to forecast how the passengers are likely to complete their onward journey.

In a specific example, if anomalous data indicates that a subway station is experiencing a disruption, the anomaly detector 110 can send messages to implement "aliasing" as part of a response plan. Aliasing is a technique that enables adjacent transit stations or stops to appear, for purposes of ticketing, to be the location of the station or stop experiencing a disruption in service. This enables passengers' tickets to work if they exit or enter a station before or after the affected station or stop. Additionally or alternatively, aliasing can be extended across transportation modes such that rail-only tickets may be accepted on buses to keep passengers moving.

To implement aliasing and other solutions, the anomaly detector 110 may therefore send messages to transit personnel and/or passengers informing them of the disruption in service and the solution(s) being provided. Messages may also be sent to entities outside the transit system, such as taxi and external bus services, to help accommodate passengers during a transit disruption. In cases of emergency, messages may be sent to police, fire, and/or other emergency services.

Messages may additionally or alternatively be sent to devices and as part of a response plan. For example, aliasing solutions may entail access control points and/or other devices to accept tickets that they would not accept under normal operating conditions. Journey planners 190 could enable passengers to plan journeys that accommodate changes in the transit system due to any disruptions in service. Ticket booth computers 150 and/or transit vending machines 160 could indicate a disruption in service to staff (transit personnel) and/or passengers, and issue tickets that accommodate travel that has been modified to adjust for the disruption.

After messages have been sent, and while the anomaly detector 110 continues to receive anomalous data, the anomaly detector 110 can, at state 430, determine that the transit system 100 is functioning under modified operation. That is, the response plans implemented in response to problems identified by the anomalous data can continue to be executed while the anomalous data is continuing to be received.

Once normal (non-anomalous) data is received, the anomaly detector 110 can begin the process of restoring normal operation. Again, in some instances, perhaps a single normal datum may trigger the change from state from state 430 to state 440. In other cases, the data may first be verified (e.g., using diagnostics and/or other verification techniques performed by the source of the normal data) and/or a certain amount of normal data is first collected before changing to state 440. Again, such verification and/or anomalous data threshold amount(s) may be configurable by an administrator.

Once in state 440, the anomaly detector can send one or more messages to humans (an administrator, transit personnel, transit passengers, etc.), devices, systems, and the like to indicate that the problem/disruption is over, that the implementation of the one or more response plans is ending, and/or to resume normal operation of transit procedures, devices, systems, etc. The anomaly detector then proceeds back to state 410.

Figure 5:
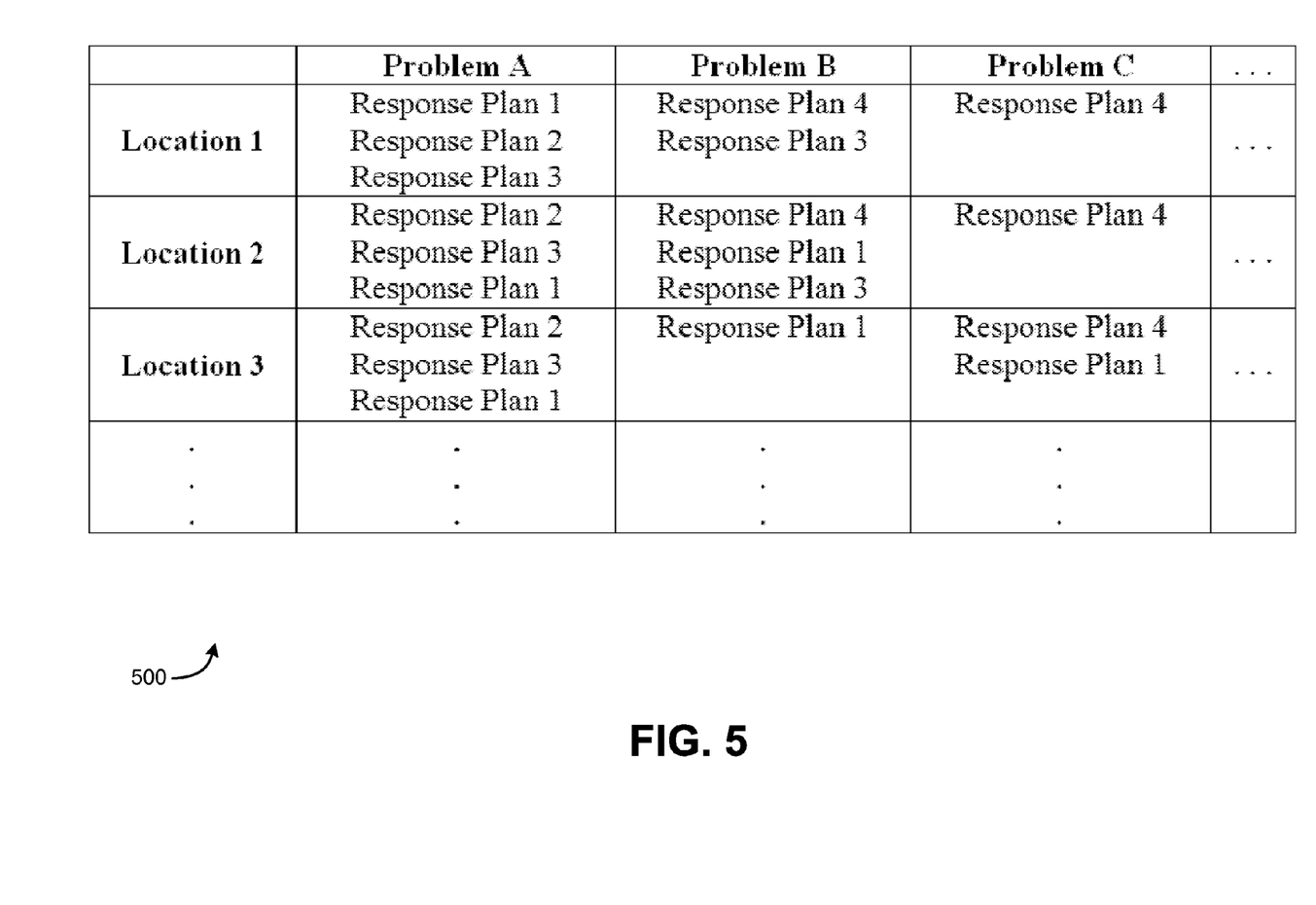
FIG. 5 is a table illustrating an embodiment of how one or more response plans may be mapped to different problems occurring at different locations.

FIG. 5 is a table 500 illustrating an embodiment of how one or more response plans may be mapped to different problems occurring at different locations. This mapping may be stored, for example, in a database or other data structure of the data store 210 of the anomaly detector 110. Here, only a few problems, locations, and response plans are illustrated, although it will be understood that far more problems, locations, and/or response plans may be included in various implementations.

In the embodiment illustrated, one or more response plans are mapped to various identified problems occurring at various locations. As noted above, response plans may include one or solutions to implement in response to an identified problem. There may be overlap between response plans, such that one or more solutions in one response plan (e.g., Response Plan 1) may also be in another response plan (e.g., Response Plan 2). However, the response plans may differ in other respects, such in the order of implementation, inclusion of other solutions, and so forth.

Solutions may include aliasing, sending messages to people (transit personnel, transit passengers, outside entities, etc.), sending messages to devices (machines, sensors, systems, etc.) to cause them to alter their operation, and so forth. Aliasing, for example, is a simple yet powerful solution to a common problem. There are many common transportation disruptions that could be modeled, each with equally simple yet powerful solutions that could be pre-planned and ready for deployment when needed, using the anomaly detector. As noted in the table 500, the response plans may vary, depending on a location at which the problem occurs.

In some embodiments and/or instances, response plans may be presented to an administrator for selection before implementation. That is, the anomaly detector 110 may send a message to an administrator indicating that anomalous data suggests a problem has occurred. Using the mapping in the table 500, the anomaly detector 110 can then present the one or more solutions corresponding to the identified problem type and location, and allow the administrator to select which, if any, of the response plans to implement. More than one response plan may be implemented.

Response plans may be prioritized based on prior selection or success (e.g., a response plan that is frequently chosen for a given problem/location may be prioritized over a response plan that is rarely or never chosen). Additionally or alternatively, reports may be automatically and/or manually generated, comparing the actual disruption effect in view of past measurements of similar disruption effects. Over time this data can be used to determine whether implemented response plans are more or less effective than prior response plans. Thus, priority may be further calculated by this determined effectiveness. Regardless of how it is determined, priority may be conveyed to the administrator, for example, when the solutions are presented for selection (as shown in table 500).

Response plan may be generated, for example, by reviewing and logging real reactions to transport disruptions to help develop plans for similar future disruptions. Instructions published or problems encountered can be stored with response plan for reuse. For example, system configuration data that had to be updated in reaction to a disruption can be saved and made ready for any repeat disruptions. This information may be stored with corresponding response plans and/or solutions by the anomaly detector 110 (e.g., in the data store 210). Additionally or alternatively, storing this data with identifiable, searchable names may allow response plans to be retrieved efficiently when needed in the future.

It is noted that the implementation illustrated suggests that the anomaly detector 110 has identified one or more problems by analyzing anomalous data. Such problems can, for example, be mapped to anomalous data in a similar manner, which may be based (at least in part) on user input (e.g., input from an administrator using a user interface of the anomaly detector). Alternatively, tables and/or other data structures may be used that map response plans directly to anomalous data.

In some embodiments, response plans and/or their corresponding solutions may be organized manually. In such cases, the anomaly detector 110 can allow the response plans to be logged and may further enable an administrator to generate requests and log responses directly within the transit system.

Figure 6:
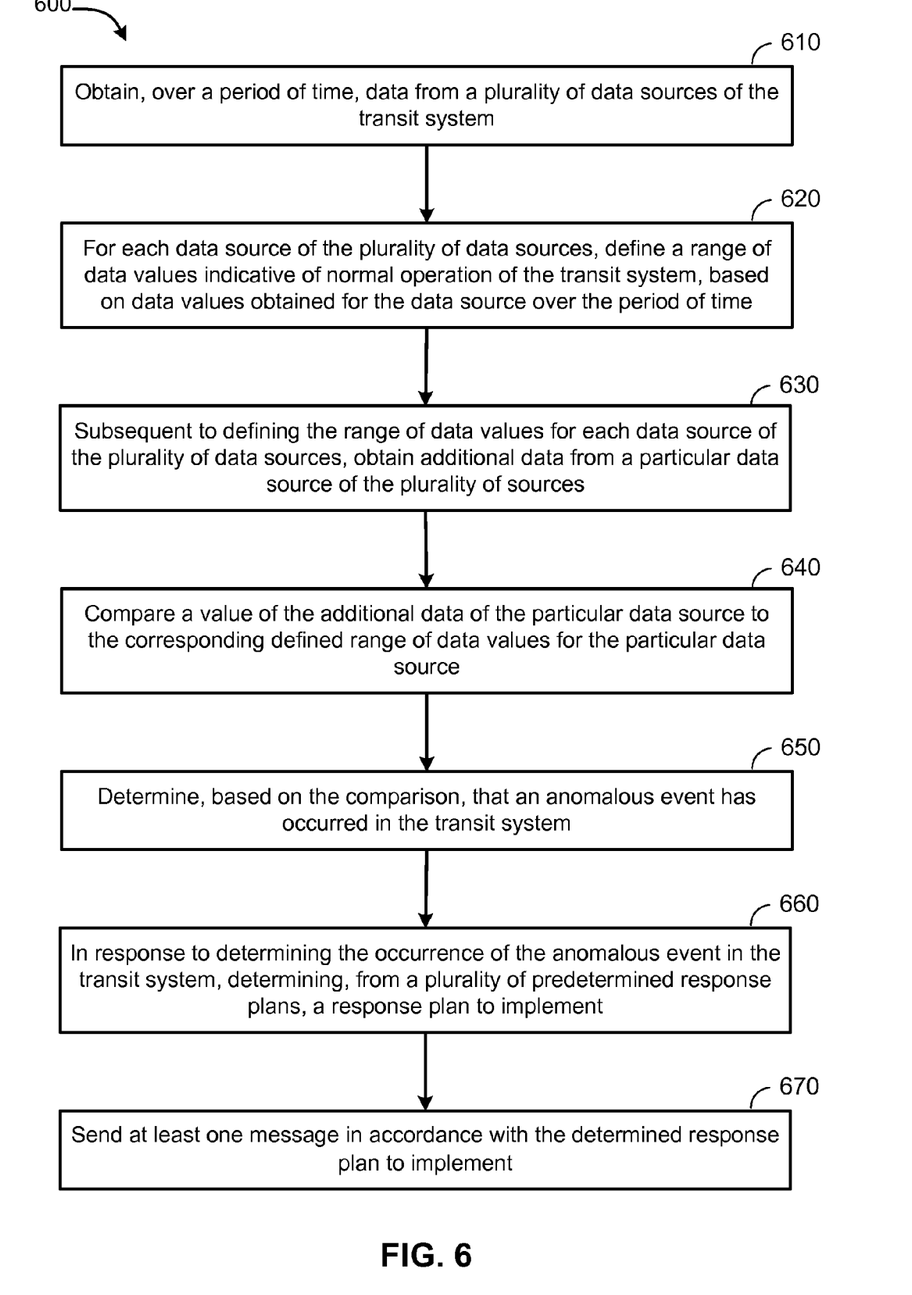
FIG. 6 is a flow diagram of a method of detecting anomalous phenomena in a transit system, according to one embodiment.

FIG. 6 is a flow diagram 600 of a method of detecting anomalous phenomena in a transit system, according to one embodiment. Some or all of the components of the method, as illustrated in FIG. 6 may be implemented by an anomaly detector 110 as described herein. Moreover, means for performing one or more of the functions illustrated in FIG. 6 may include software and/or hardware components of the anomaly detector 110, which can be implemented by a computer system, such as the computer system 700 shown in FIG. 7 below.

At block 610, data from a plurality of data sources of the transit system is obtained over a period of time. As described above and shown in FIG. 1, there may be several data sources internal and external to the transit system from which data may be collected. The period of time over which data is collected may determine the level of granularity by which data is subsequently analyzed. In some embodiments, a minimum period of time may be established before data is subsequently analyzed for anomalies.

At block 620, a range of data values indicative of normal operation of the transit system is defined for each data source of the plurality of data sources. As shown in FIG. 3, this range may include values for a majority (e.g., 51%, 60%, 75%, 80%, 90%, 95%, 99%, or 99.9% of the time, etc.) of historical values received from the data source, and/or a range established by values received by the data source during a period of time at which the transit system was operating under verified normal, or typical, conditions. As previously noted, any of a variety of algorithms may be implemented to determine the range of normal data values, which may be based on factors such as the number of values received, distribution, the standard deviation, and so forth. Additionally, devices such as access control points may be treated as data sources individually and/or collectively, such that a range of data values indicative of normal operation may be applied to a single device and/or a group of devices.

At block 630, subsequent to defining the range of data values for each data source of the plurality of data sources, additional data is obtained from a particular data source of the plurality of data sources. That is, once the range of normal values has been established, data may then be collected and analyzed for anomalies. Accordingly, at block 640, a value of the additional data of the particular data source is compared to the corresponding defined range of data values for the particular data source. For example, a value received by a data source may be compared with historical values to determine whether the value falls within the range of values indicative of normal operation as defined at block 620. As shown in FIG. 3, this may entail comparing the value with one or more thresholds (e.g., lower threshold 350 and/or upper threshold 360) to determine whether the value is normal or anomalous.

At block 650, it is determined, based on the comparison, that an anomalous even has occurred in the transit system. Such a determination can occur, for example, when a value surpasses a threshold against which it is compared (at block 640). In response to determining the anomalous event in the transit system, a response plan to implement is determined from a plurality of predetermined response plans, at block 660. As previously explained, each response plan may include one or more solutions to implement. These response plans and/or solutions may be location specific. Because anomalous data can be traced to a particular data source with a particular location, a location associated with the occurrence of the anomalous event may be identified. Additionally, because anomalous data may be indicative of a particular problem, a problem associated with the occurrence of the anomalous event may additionally or alternatively be identified. Thus, the determination of the response plan to implement may be based, at least in part, on the identified location and/or the identified problem, as shown in FIG. 5.

The determination of the response plan to implement may be based on a selection of the response plan by a human administrator (e.g., via a user interface of the anomaly detector). In some embodiments, for example, prior to determining the response plan to implement, an indication of the occurrence of the anomalous event may be sent to a user. User input indicative of a response plan may then be received. Determining the response plan to implement may therefore be based on the received user input.

User input prior to the receipt of the anomalous event may also be used for determining the response plan. In some embodiments, for example, prior to obtaining the additional data from the particular data source at block 630, user input may correlate one or more solutions to a type of anomalous event. That is, a human user (e.g., an administrator) may map one or more solutions to a type of anomalous event. Thus, when the anomalous event occurs, the one or more solutions may be implemented. That said, such user input may additionally or alternatively be provided subsequent to the receipt of the anomalous data. Thus, determining the response plan to implement may be based on this user input.

Finally, at block 650, at least one message is sent in accordance with the selected response plan. As indicated previously, messages may be sent to human personnel and/or passengers via email, text, phone call, or the like. In some instances, a message may be sent via an application executed by a mobile device. For example, a message may be pushed to the application, which would then cause the mobile device to alert the recipient. Additionally or alternatively, messages to human recipients may be conveyed via devices in the transit system. For example, a message might also be sent to a service panel dashboard and/or other display providing information to transit personnel, which could display a warning indicator to alert one or more transit personnel in an operating center. Messages may additionally or alternatively be sent to one or more devices or systems to cause them to alter their function as part of the determined response plan to implement. Furthermore, the at least one message may comprise a message to an entity outside the transit system. For example, as indicated above, the anomaly detector may send a message to a taxi, bus, or other "rescue" operator to indicate a disruption at a particular subway stop. Additionally or alternatively, a message may be sent to police, fire, and/or other emergency services when a detected problem is indicative of an emergency situation.

In view of this description, it will be clear to a person of ordinary skill in the art that embodiments of the present invention provide for one or more of:

1. Automatic instigation of multi-modal incident responses and informing passengers of the alternate solutions in place.
2. Analysis of traffic disruptions and passenger movements from a number of sources to detect anomalies. In the example of a main railway line, this can include all transport modalities to and from any station along the line. It also can include other data such as major public events, weather warnings, etc.
3. Automatic adaptation and refinement of pre-defined response plans during and after incident, according to measured outcome.
4. Use of any available channel to inform passengers about disruptions, including at locations close to or in other ways relevant to the disruption (e.g., motorway overhead signage in vicinity of rail disruption).

Figure 7:
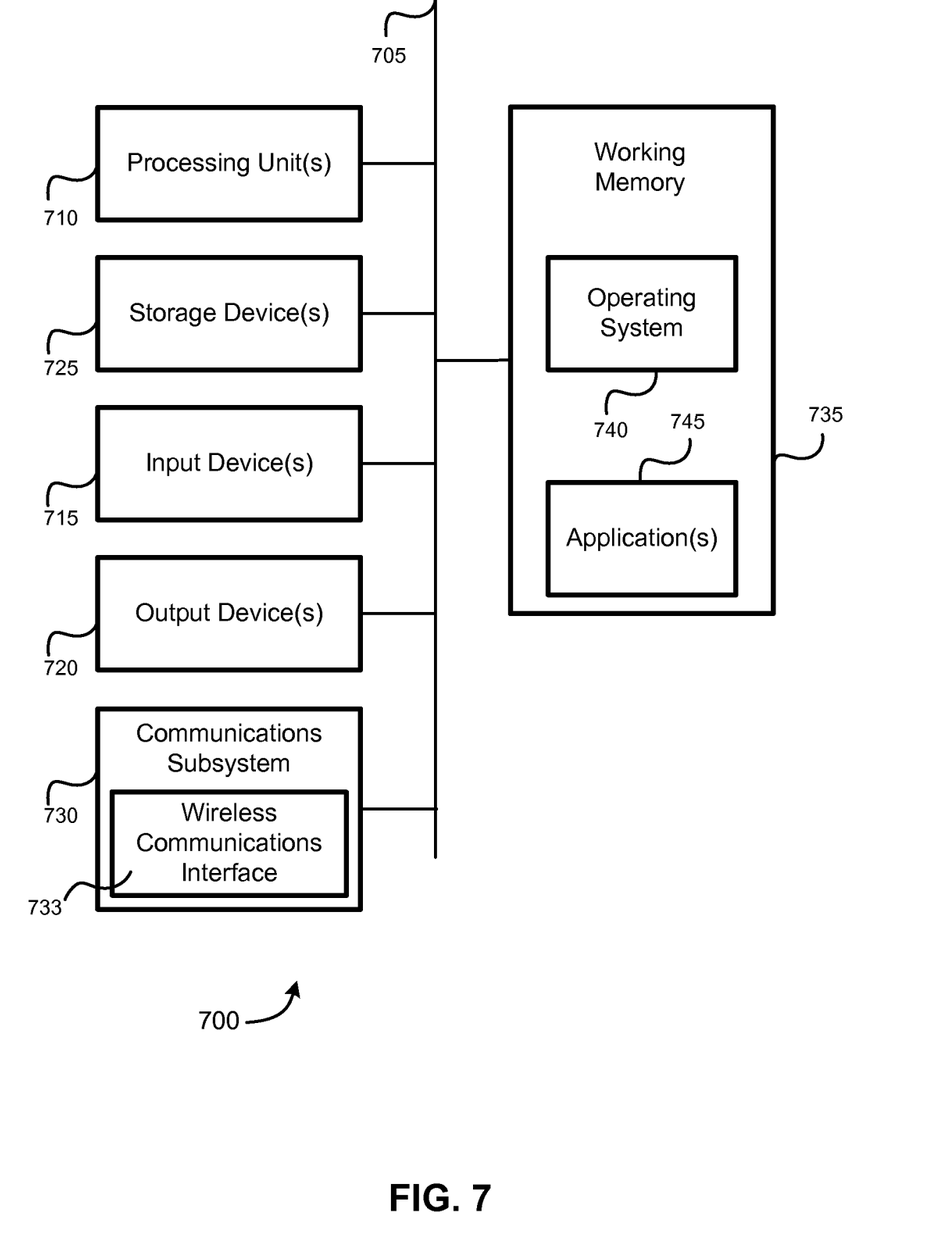
FIG. 7 is a block diagram of an embodiment of a computer system.

A computer system as illustrated in FIG. 7 may be incorporated as part any of the previously described computerized devices. For example, computer system 700 can represent some or all of the components of the anomaly detector 110 and/or other components of the transit system illustrated in FIG. 1. Moreover, one or more of the hardware and/or software components of the computer system 700 may be used to implement the different components of the anomaly detector 110 shown in FIG. 2.

Additionally, the computer system 700 can perform the methods provided by various other embodiments, as described herein (e.g., in relation to FIGS. 4, 5, and 6), and/or can function as the host computer system, a remote kiosk/terminal, a point-of-sale device, a mobile device, and/or a computer system. FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include a processing unit 710, including without limitation one or more general-purpose processors and/or one or more special-purpose processors (such as digital signal processing chips, graphics acceleration processors, and/or the like); one or more input devices 715, which can include without limitation a mouse, a keyboard, a touchscreen, a global positioning system (GPS) receiver, a motion sensor, a camera, and/or the like; and one or more output devices 720, which can include without limitation a display device, a speaker, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data stores (such as the data store 210 of FIG. 2), including without limitation, various file systems, database structures, and/or the like.

The computer system 700 might also include a communication interface 730, which can include without limitation a modem, a network card (wireless or wired), an infrared communication device, a wireless communication device and/or chipset (such as a Bluetooth™ device, an 802.11 device, a WiFi device, a WiMax device, an NFC device, cellular communication facilities, etc.), and/or similar communication interfaces. The communication interface 730 may permit data to be exchanged with a network (such as the network described below, to name one example), other computer systems, and/or any other devices described herein. In many embodiments, the computer system 700 will further comprise a non-transitory working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Moreover, hardware and/or software components that provide certain functionality can comprise a dedicated system (having specialized components) or may be part of a more generic system. For example, an journey planning and pricing engine configured to provide some or all of the features described herein relating to the journey planning and/or pricing can comprise hardware and/or software that is specialized (e.g., an application-specific integrated circuit (ASIC), a software method, etc.) or generic (e.g., processing unit 710, applications 745, etc.) Further, connection to other computing devices such as network input/output devices may be employed.

Some embodiments may employ a computer system (such as the computer system 700) to perform methods in accordance with the disclosure. For example, some or all of the procedures of the described methods may be performed by the computer system 700 in response to processing unit 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the storage device(s) 725. Merely by way of example, execution of the sequences of instructions contained in the working memory 735 might cause the processing unit 710 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 700, various computer-readable media might be involved in providing instructions/code to processing unit 710 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 725. Volatile media include, without limitation, dynamic memory, such as the working memory 735. Transmission media include, without limitation, coaxial cables, copper wire and fiber optics, including the wires that comprise the bus 705, as well as the various components of the communication interface 730 (and/or the media by which the communication interface 730 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a magnetic medium, optical medium, or any other physical medium with patterns of holes, a RAM, a PROM, EPROM, a FLASH-EPROM, any other memory chip or cartridge, a carrier wave as described hereinafter, or any other medium from which a computer can read instructions and/or code.

The communication interface 730 (and/or components thereof) generally will receive the signals, and the bus 705 then might carry the signals (and/or the data, instructions, etc. carried by the signals) to the working memory 735, from which the processor(s) 705 retrieves and executes the instructions. The instructions received by the working memory 735 may optionally be stored on a non-transitory storage device 725 either before or after execution by the processing unit 710.

The methods, systems, and devices discussed above are examples. Some embodiments were described as processes depicted as flow diagrams or block diagrams. Although each may describe the operations as a sequential process, many of the operations can be performed in parallel or concurrently. In addition, the order of the operations may be rearranged.

A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A method of detecting anomalous phenomena in a transit system implemented by an anomaly detector, the method comprising:
    obtaining, over a period of time by the anomaly detector, data from a plurality of data sources of the transit system, the data sources including journey planners, traffic system(s), access control points, transit ticket vending machines, ticket booth computers, emergency sensor(s), user input interface console, and location system(s), all of the transit system;
    for each data source of the plurality of data sources, defining, by a data monitoring module of the anomaly detector, a range of data values indicative of normal operation of the transit system, based on data values obtained for the data source over the period of time;
    subsequent to defining the range of data values for each data source of the plurality of data sources, obtaining, by the anomaly detector, additional data from a particular data source of the plurality of data sources;
    comparing, by the anomaly detector, using a processing unit, a value of the additional data from the particular data source to the corresponding defined range of data values for the particular data source;
    determining, by the anomaly detector, based on the comparison, that an anomalous event has occurred in the transit system including a particular one or more transit system station or stop affected by the anomalous event;
    in response to determining the occurrence of the anomalous event in the transit system, determining, by the anomaly detector, from a plurality of predetermined response plans, a response plan to implement;
    sending by the anomaly detector, at least one message to system devices, personnel and passengers, of the transit system in accordance with the determined response plan to implement; and
    implementing the response plan by including automatically aliasing passenger tickets to permit the passenger tickets to work if the passengers exit or enter a transit system station or stop that is before or after a determined affected transit system station or stop.

2. The method of detecting anomalous phenomena in a transit system of claim 1, further comprising:
    prior to determining the response plan to implement, sending an indication of the occurrence of the anomalous event to a user; and
    receiving a user input, via a communication interface coupled to the anomaly detector, indicative of user approval confirmation of the determined response plan or an alternative response plan to implement;
    wherein, implementing the response plan is based on the received user input.

3. The method of detecting anomalous phenomena in a transit system of claim 1, wherein sending the at least one message causes at least one device in the transit system to alter its operation.

4. The method of detecting anomalous phenomena in a transit system of claim 1, wherein the at least one message is sent to a person, the at least one message comprising at least one of:
    a text message,
    a telephone message,
    a message sent via an application on a mobile device,
    a message sent to a display device, causing the display device to display a warning, or
    an email.

5. The method of detecting anomalous phenomena in a transit system of claim 1, further comprising identifying a location associated with the occurrence of the anomalous event.

6. The method of detecting anomalous phenomena in a transit system of claim 5, further comprising identifying a problem associated with the occurrence of the anomalous event, wherein determining the response plan to implement is based on the identified location and a type of the identified problem.

7. The method of detecting anomalous phenomena in a transit system of claim 1, further comprising receiving, prior to obtaining additional data from the particular data source, user input correlating one or more solutions to a type of anomalous event, wherein determining the response plan to implement is based on the user input.

8. The method of detecting anomalous phenomena in a transit system of claim 1, further comprising information identifying a disrupting operator disrupted by the anomalous event.

9. The method of detecting anomalous phenomena in a transit system of claim 8, further comprising information for conveying funds from the disrupting operator to one or more rescue operators, related to implementing the determined response plan.

10. A computer for detecting anomalous phenomena in a transit system, comprising:
    a communication interface configured to obtain, over a period of time, data from a plurality of data sources of the transit system, the data sources including journey planners, traffic system(s), access control points, transit ticket vending machines, ticket booth computers, emergency sensor(s), user input interface console, and location system(s), all of the transit system;
    a memory for storing said data; and
    a processing unit communicatively coupled with the communication interface and the memory, the processing unit configured to:
    for each data source of the plurality of data sources, define a range of data values indicative of normal operation of the transit system, based on data values obtained for the data source over the period of time via the communication interface;
    subsequent to defining the range of data values for each data source of the plurality of data sources, obtain additional data from a particular data source of the plurality of data sources via the communication interface;
    compare a value of the additional data from the particular data source to the corresponding defined range of data values for the particular data source;

determine, based on the comparison, that an anomalous event has occurred in the transit system including a particular one or more transit system station or stop affected by the anomalous event;

in response to determining the occurrence of the anomalous event in the transit system, determine, from a plurality of predetermined response plans, a response plan to implement;

send, via the communication interface, at least one message to system devices, personnel and passengers, of the transit system in accordance with the determined response plan to implement; and implement the response plan, from the plurality of the predetermined response plans, by including automatically aliasing passenger tickets to permit the passenger tickets to work if the passengers exit or enter a transit system station or stop that is before or after a determined affected transit system station or stop.

11. The computer of claim 10, wherein the processing unit is further configured to:

prior to determining the response plan to implement, send an indication of the occurrence of the anomalous event to a user, via the communication interface; and receive, via the communication interface, a user input indicative of user approval confirmation of the determined response plan or an alternative response plan to implement;

wherein, implementing the response plan is based on the received user input.

12. The computer of claim 10, wherein the processing unit is configured to include, in the at least one message, instructions for causing at least one device in the transit system to alter its operation.

13. The computer of claim 10, wherein the processing unit is configured to send the at least one message to a person, the at least one message comprising at least one of:
a text message,
a telephone message,
a message sent via an application on a mobile device,
a message sent to a display device, causing the display device to display a warning, or
an email.

14. The computer of claim 10, wherein the processing unit further is configured to identify a location associated with the occurrence of the anomalous event.

15. The computer of claim 10, wherein the communication interface is further configured to receive, prior to obtaining additional data from the particular data source, user input correlating one or more solutions to a type of anomalous event, and wherein the processing unit is configured to determine the response plan to implement based on the user input.

16. The computer of claim 10, wherein the processing unit is further configured to identify a disrupting operator disrupted by the anomalous event.

17. A non-transitory computer-readable medium, having instructions stored thereon, implemented by an anomaly detector for detecting anomalous phenomena in a transit system, the instructions comprising computer code for:

obtaining, over a period of time by the anomaly detector, data from a plurality of data sources of the transit system, the data sources including journey planners, traffic system(s), access control points, transit ticket vending machines, ticket booth computers, emergency sensor(s), user input interface console, and location system(s), all of the transit system;

for each data source of the plurality of data sources, defining by a data monitoring module of the anomaly detector a range of data values indicative of normal operation of the transit system, based on data values obtained for the data source over the period of time;

subsequent to defining the range of data values for each data source of the plurality of data sources, obtaining by the anomaly detector additional data from a particular data source of the plurality of data sources;

comparing by the anomaly detector a value of the additional data from the particular data source to the corresponding defined range of data values for the particular data source;

determining by the anomaly detector, based on the comparison, that an anomalous event has occurred in the transit system including a particular one or more transit system station or stop affected by the anomalous event;

in response to determining the occurrence of the anomalous event in the transit system, determining by the anomaly detector, from a plurality of predetermined response plans, a response plan to implement; and sending by the anomaly detector at least one message to system devices, personnel and passengers, of the transit system in accordance with the determined response plan to implement; and implementing the response plan by including automatically aliasing passenger tickets to permit the passenger tickets to work if the passengers exit or enter a transit system station or stop that is before or after a determined affected transit system station or stop.

18. The non-transitory computer-readable medium of claim 17, wherein the instructions further comprise computer code for:

prior to determining the response plan to implement, sending by the anomaly detector an indication of the occurrence of the anomalous event to a user; and receiving a user input, via a communication interface coupled to the anomaly detector, indicative of user approval confirmation of the determined response plan or an alternative response plan to implement; wherein, the computer code for implementing the response plan further comprises computer code for basing the determination of the response plan on the received user input.

* * * * *